(12) United States Patent
Schubert (10) Patent No.: US 7,230,418 B2
(45) Date of Patent: Jun. 12, 2007

(54) FLUTTER REDUCTION APPARATUS AND METHOD

(75) Inventor: Thomas A. Schubert, Sycamore, IL (US)

(73) Assignee: Auto Meter Products, Inc., Sycamore, IL (US)

( * ) Notice: Subject to any disclaimer, the term of this patent is extended or adjusted under 35 U.S.C. 154(b) by 178 days.

(21) Appl. No.: 10/892,370

(22) Filed: Jul. 16, 2004

(65) Prior Publication Data

US 2006/0012361 A1 Jan. 19, 2006

(51) Int. Cl.
*G01P 3/44* (2006.01)
(52) U.S. Cl. ..................................... 324/167
(58) Field of Classification Search ........ 324/160–180; 116/284
See application file for complete search history.

(56) References Cited

U.S. PATENT DOCUMENTS

| | | | |
|---|---|---|---|
| 3,586,949 A | 6/1971 | Spear et al. | |
| 3,614,616 A | 10/1971 | Bucek et al. | |
| 3,626,247 A | 12/1971 | Morse | |
| 3,636,451 A | 1/1972 | Westberg | |
| 3,662,251 A | 5/1972 | Smith | |
| 3,662,252 A | 5/1972 | Smith | |
| 3,822,402 A | 7/1974 | Vest | |
| 3,886,450 A | 5/1975 | Trussell et al. | |
| 3,893,014 A | 7/1975 | Vacek | |
| 3,934,200 A | 1/1976 | Schoonover et al. | |
| 3,978,719 A | 9/1976 | Hadden et al. | |
| 4,059,799 A | 11/1977 | Faria | |
| 4,079,302 A * | 3/1978 | Norton | 318/632 |
| 4,386,320 A | 5/1983 | Lafrance | |
| 4,449,082 A | 5/1984 | Webster | |
| 4,459,548 A | 7/1984 | Lentz et al. | |
| 4,553,093 A * | 11/1985 | Chikasue | 324/169 |
| 4,705,969 A | 11/1987 | Gross | |
| 4,970,458 A | 11/1990 | Fox | |
| 5,004,979 A | 4/1991 | Marino et al. | |
| 5,182,512 A | 1/1993 | Braun et al. | |
| 5,311,118 A * | 5/1994 | Fukuda | 324/144 |
| 5,313,155 A * | 5/1994 | Yamamoto et al. | 324/143 |
| 5,883,510 A | 3/1999 | Torre et al. | |
| RE38,100 E | 4/2003 | Rentsch et al. | |

* cited by examiner

*Primary Examiner*—Edward Lefkowitz
*Assistant Examiner*—Kenneth J. Whittington
(74) *Attorney, Agent, or Firm*—Dickstein Shapiro LLP (57) ABSTRACT

A tachometer circuit includes a flutter reduction circuit and a tachometer. The tachometer circuit cancels pointer flutter in the tachometer without adversely affecting pointer response.

20 Claims, 8 Drawing Sheets

DIVIDER = 10K/10K
0 TO 8K RPM STEP

FIG. 3A

DIVIDER = 10K/10K
8K TO 0 RPM STEP

FIG. 3B

DIVIDER = 10K/30K
0 TO 8K RPM STEP

FIG. 3C

DIVIDER = 10K/30K
8K TO 0 RPM STEP

FIG. 3D

DIVIDER = 10K/47K
0 TO 8K RPM STEP

FIG. 3E

DIVIDER = 10K/47K
8K TO 0 RPM STEP

FIG. 3F

FLUTTER REDUCTION APPARATUS AND METHOD

FIELD OF THE INVENTION

The invention relates to an apparatus and method for reducing flutter in an electronic tachometer for a vehicle.

BACKGROUND OF THE INVENTION

In traditional tachometers, engine RPM (revolutions per minute) is converted to a representative voltage by feeding pulses from the ignition system to a frequency-to-voltage converter circuit. Every pulse from the ignition adds a fixed electrical charge to the driver circuit; the faster the engine runs, the faster the ignition pulses occur, and the more charges are pumped into the driver circuit. A driver circuit causes the pointer to move at an angle proportional to the rate that the charges occur.

There are many known tachometers. Some of which are discussed below. For example, U.S. Pat. No. 5,004,979 to Marino et al. describes a battery tachometer, where the input signal is from the battery, which is related to the RPM of the engine.

U.S. Pat. No. 5,182,512 to Braun et al. describes an engine analyzer (handheld tachometer) designed to be held in contact with a fan belt of an engine to determine cylinder power balance (from engine speed variations). That is, the handheld tachometer is used for determining the relative power contributions of a multi-cylinder internal combustion engine. The engine analyzer is used for cars, which have a different number of pulses per revolution.

U.S. Pat. No. RE38,100 to Rentsch et al. describes a tachometer apparatus including a microphone for disposition next to the exhaust and an accelerometer next to the engine. That is, the apparatus is an external device that calculates and which displays the speed of the engine based on sensing engine vibrations. The tachometer has two channels, where one channel is used when the engine is idle and another channel is used when the engine is in normal operation.

U.S. Pat. No. 4,705,969 to Gross describes a tachometer circuit that has a zero ripple DC output that is directly proportional to the frequency. The circuit uses two full wave rectifiers to act on the sine and cosine signal inputs. The signal is rectified, squared, summed and extracted.

U.S. Pat. No. 5,883,510 to Torre et al. describes a ground pick-up tachometer, separate from the vehicle ground. The '510 patent describes a noise threshold, but does not remove flutter.

U.S. Pat. No. 4,059,799 to Faria describes a tachometer apparatus for use on automobile assembly lines and accepts an electric pulse input of frequency, which is directly related to engine speed. The purpose is to measure speed of engines with different numbers of cylinders on an assembly line. The pulsating input signal is characterized by pulses of alternating polarity and uses a rectifier with shunts to measure the speed of the engines passing through the assembly line.

U.S. Pat. No. 3,978,719 to Hadden et al. describes an external apparatus including a pressure transducer for sensing pressure variations at the exhaust of a vehicle. That is, the apparatus is external to the engine and the signal sensed is passed through an amplifier with automatic gain control and then through a tracking filter to separate the prominent frequency component.

U.S. Pat. No. 3,934,200 to Schoonover et al. describes an apparatus for producing a non-linear ripple-free output voltage using a temperature compensation circuit, a ripple reduction circuit, a linearity compensation circuit, a summing amplifier circuit and a low RPM linearity compensation circuit.

U.S. Pat. No. 3,893,014 to Vacek describes a system whereby ripple is removed independent of generator speed using two tachometer generators where both signals are full wave rectified to eliminate the fundamental.

U.S. Pat. No. 3,886,450 to Trusell et al. describes an apparatus for measuring the RPM of an internal combustion engine without attachment to the engine.

U.S. Pat. No. 3,822,402 to Vest describes producing a voltage across a meter that varies essentially linearly with engine speed.

U.S. Pat. No. 3,662,252 to Smith describes a tachometer including an alternator connected to a shaft which generates an alternating voltage.

U.S. Pat. No. 3,662,251, "Method and System for Measuring Acceleration and Velocity" by Smith describes the simultaneous generation of acceleration and velqcity signals.

U.S. Pat. No. 3,636,451 to Westberg describes an apparatus for use with engines having a different number of cylinders. The apparatus uses a relay switch and a relay coil.

U.S. Pat. No. 3,614,616 to Bucek et al. describes an AC tachometer and circuit in which an AC tachometer generator has two out-of-phase windings independently connected through rectifiers with outputs connected in parallel to provide a DC output potential indicative of the rate of rotation.

U.S. Pat. No. 3,586,949 to Spear et al. describes a tachometer that is used to generate a signal indicative of the motor speed which is combined with a command signal and a current limit signal.

Traditional tachometers, however, suffer from a visible pointer flutter at low pulse rates. This situation is aggravated by the 1 and ½ pulse per revolution ignitions typically used in motorcycles. Traditional solutions have been ineffective and cause other problems (e.g., they reduce flutter at the expense of slowing down the response of the pointer when there are rapid changes in the engine RPM).

Accordingly, it is desirable to reduce flutter in a tachometer without adversely affecting the response of the tachometer.

BRIEF SUMMARY OF THE INVENTION

The invention provides a tachometer that accepts an input from the ignition system of an engine and using a high pass filter and a driver circuit reduces tachometer pointer flutter without reducing its pointer responsiveness.

In one aspect of the invention a flutter reduction circuit for use with a tachometer comprises a high pass filter circuit; and a driver circuit electrically coupled to said high pass filter circuit, said high pass filter circuit passing unwanted input signals to a first circuit within the driver adapted to cancel out the signals and said high pass filter circuit generating a voltage to cancel ripple voltages.

In another aspect of the invention a tachometer circuit comprises a tachometer; and a flutter reduction circuit electrically coupled to and driving said tachometer, said flutter reduction circuit generating a voltage to cancel ripple voltages.

In yet another aspect of the invention, a tachometer circuit comprises means for inputting a pulsed ignition signal; means for converting the pulsed ignition signal to a voltage;

means for converting the voltage into a first signal; and means for canceling pointer flutter in a tachometer using the first signal.

In a further aspect of the invention, a method of operating a tachometer circuit comprises the acts of inputting a pulsed ignition signal; converting the pulsed ignition signal to a voltage; converting the voltage into a first signal; and canceling pointer flutter in a tachometer using the first signal.

DETAILED DESCRIPTION OF THE INVENTION

The flutter reduction circuit of the present invention is a part of a tachometer for a vehicle, specifically for a motorcycle. The present invention inputs engine pulses, converts the pulses to electrical signals and outputs sine and cosine signals to control an aircore meter movement. Previous motorcycle tachometer circuits suffered from pointer flutter and poor response time. The present invention corrects these defects. It should be appreciated, however, that the tachometer circuit 50 (FIG. 1) of the invention is not to be limited to motorcycle application. That is, the invention is suitable for other devices requiring flutter reduction for a tachometer.

Figure 1:
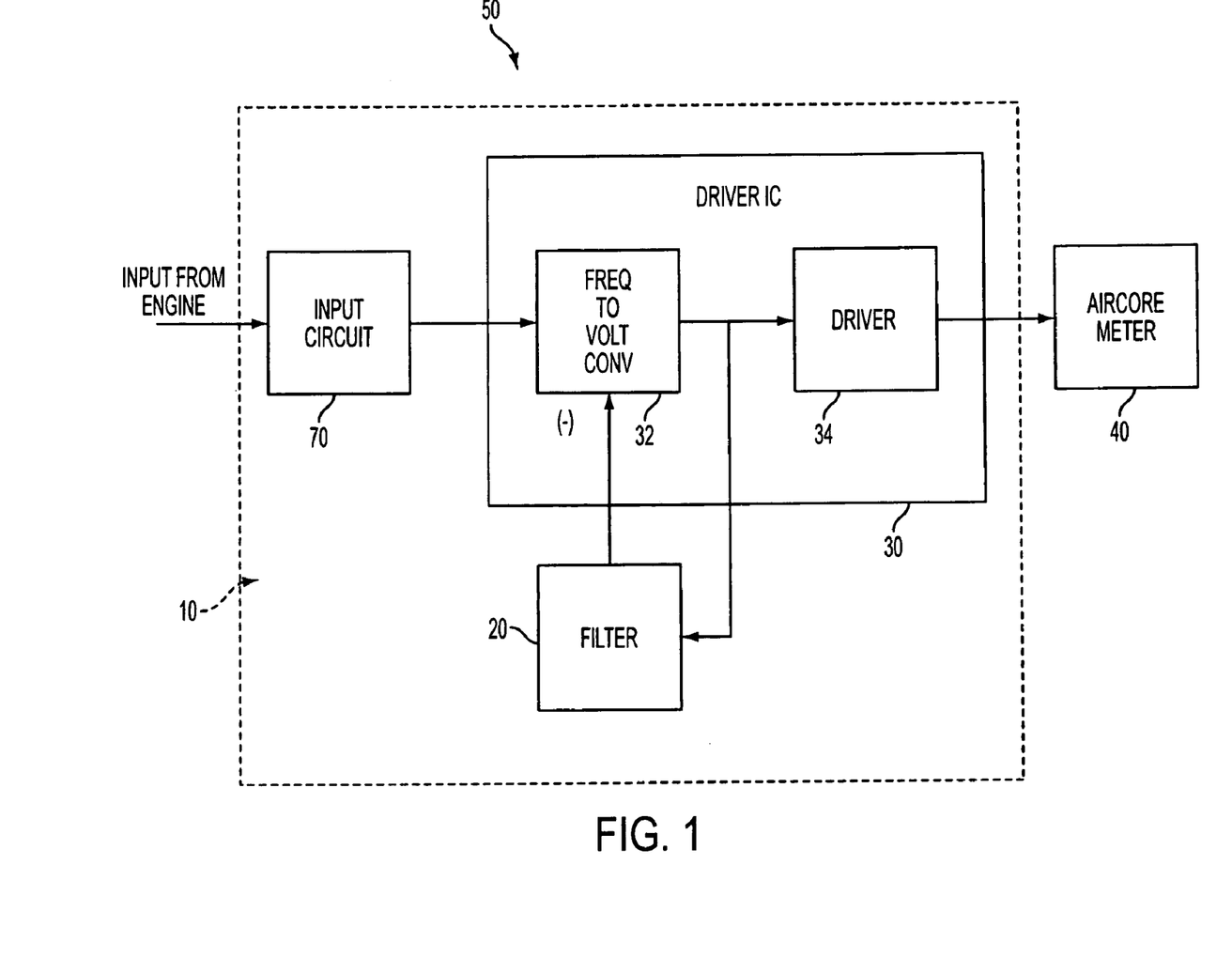
FIG. 1 is a block diagram of the tachometer circuit of the present invention.

Referring to FIG. 1, a tachometer circuit 50 constructed in accordance with the invention is connected to receive an input from an engine and includes a flutter reduction circuit 10 and an aircore meter movement 40. The illustrated flutter reduction circuit 10 includes an input circuit 70, high pass filter 20 and a tachometer driver integrated circuit 30 (referred to herein as the "driver IC 30"), which feeds the aircore meter movement 40. The illustrated driver IC 30 includes a frequency-to-voltage converter 32 and a driver 34.

In a preferred embodiment the driver IC 30 is an aircore driver integrated circuit with return to zero functionality such as the commercially available CS8190 Precision Air-Core Tach/Speedo Driver with Return to Zero integrated circuit. Although the invention is described below with specific reference to the CS8190 integrated circuit, it should be appreciated that the invention can be used with other driver circuits if so desired. In the preferred embodiment, the aircore meter movement 40 is an aircore mini-meter that is capable of being driven by the CS8190.

Figure 2:
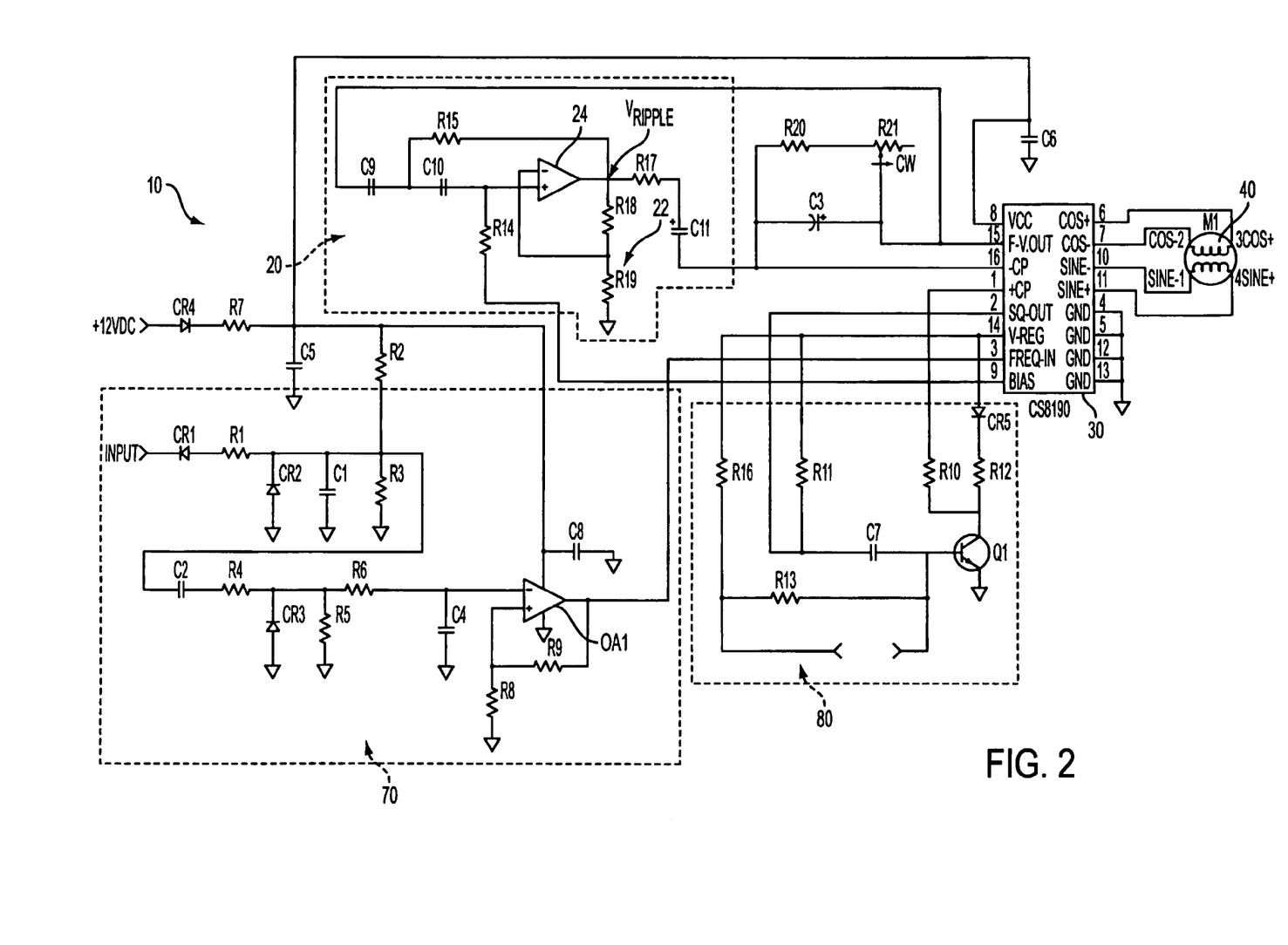
FIG. 2 is a schematic diagram of the tachometer circuit of the present invention including the flutter reduction circuit.

FIG. 2 is a more detailed illustration of the flutter reduction circuit 10, its components and its connections to the aircore meter 40. The circuit 10 includes the high pass filter 20, driver IC 30, input circuitry 70 and one shot circuit 80.

The exact components of the input circuitry 70 and one shot circuit 80 are not essential to practice the invention and are not discussed herein.

As set forth above with respect to FIG. 1, the driver IC 30 includes a frequency-to-voltage converter circuit (see e.g., output pin 15 labeled F-V.OUT). An input (e.g., pin 3 labeled FREQ-IN) of the driver IC 30 receives input pulses INPUT from the ignition system of an engine. The driver IC 30 converts the pulses to cosine and sine output signals, which are used to drive the aircore tachometer 40.

To overcome the aforementioned flutter and flutter compensation problems, the flutter reduction circuit 10 of the invention includes the high-pass filter circuit 20 connected to the driver IC 30. Specifically, an input of the high-pass filter circuit 20 is connected to the frequency-to-voltage converter output F-V.OUT. The output of the high-pass filter circuit 20 is connected to an inverting or negative charge pump input (e.g., pin 16 labeled -CP) of the driver IC 30.

The high-pass filter circuit 20 includes an operational amplifier 24 and a voltage divider 22. The high pass filter circuit 20 is connected to a charge pump filter capacitor C3. Any ripple on the frequency-to-voltage converter output F-V.OUT is fed to the inverting (negative) charge pump input -CP through this impedance. The high pass filter 20 feeds signals at 30 Hz and above back to the inverting charge pump input -CP to help cancel ripple. At lower frequencies, the sharp cutoff of the filter 20 keeps ripple from affecting performance; therefore, response time which is on the order of 1 second (or 1 HZ) is unaffected. Capacitor C11 prevents any DC offset into the inverting charge pump input -CP. Exemplary values for the charge pump filter capacitor C3 may be 1.5 µF and resistors R20 and R21 may be, for example, 100K Ω and 20K Ω, respectively.

In a preferred embodiment, filter 20 includes an operational amplifier 24 that outputs a ripple voltage Vripple. This voltage Vripple is fed back into the driver IC 30 at the inverting (negative) charge pump input -CP after it passes through output resistor R17, which may be 510Ω, for example. The filter output resistor R17 is connected in series with capacitor C11, which may be, for example, 22 µF. In operation, there is a small DC offset across capacitor C11. The ripple voltage Vripple is also fed back into operational amplifier 24 through resistor R15, which may be, for example, 100Ω.

The operational amplifier 24 is also influenced by the voltage divider 22, which includes series connected resistors R18 and R19. Resistor R18 may be, for example, 10K Ω and resistor R19 may be, for example, 47K Ω.

The operational amplifier 24 inputs the frequency-to-voltage converter output F-V.OUT through capacitors C9 and C10, which may be, for example, 0.1 µF and 0.047 µF, respectively. A bias adjustment (e.g., pin 9 of driver IC 30) provides a bias adjustment through resistor R14, which may be, for example, 100K Ω.

The driver IC 30 accepts a direct RPM sensor input FREQ-IN (e.g., pin 3) from an ignition pulse and generates sine and cosine signals to differentially drive aircore mini-meter 40. The driver IC 30 output uses differential sine and cosine drivers (e.g., pins 10 and 11 for sine, pins 6 and 7 for cosine), which eliminates the need for a zener reference and offers more torque. The driver IC 30 withstands 60V transients, which decreases the protection circuitry required.

In operation, the filter 20 inputs the frequency-to-voltage converter output F-V.OUT through capacitors C9, C10. The high-pass filter circuit 20 blocks out all voltages below a predetermined threshold and only passes or outputs the ripple voltage Vripple (at the operational amplifier 24 output as influenced by the divider circuit 22). Normally, the ripple voltage Vripple causes pointer flutter in the conventional tachometer circuit. In the flutter reduction circuit 10 of the invention, however, the ripple voltage Vripple is fed back into the driver IC 30 at the inverting charge pump input -CP. This feedback cancels out most of the pointer flutter experienced in conventional tachometer circuits.

If during operation the RPM is rapidly increased, the frequency-to-voltage converter output F-V.OUT changes, but the voltage change is blocked out by the high-pass filter circuit 20. As such, the change is not sent to the driver IC 30, which means that the rapid change in RPM is not cancelled out. This allows proper pointer response (i.e., the flutter reduction circuit 10 does not slow down the pointer response like the conventional circuits do).

Figure 3A:
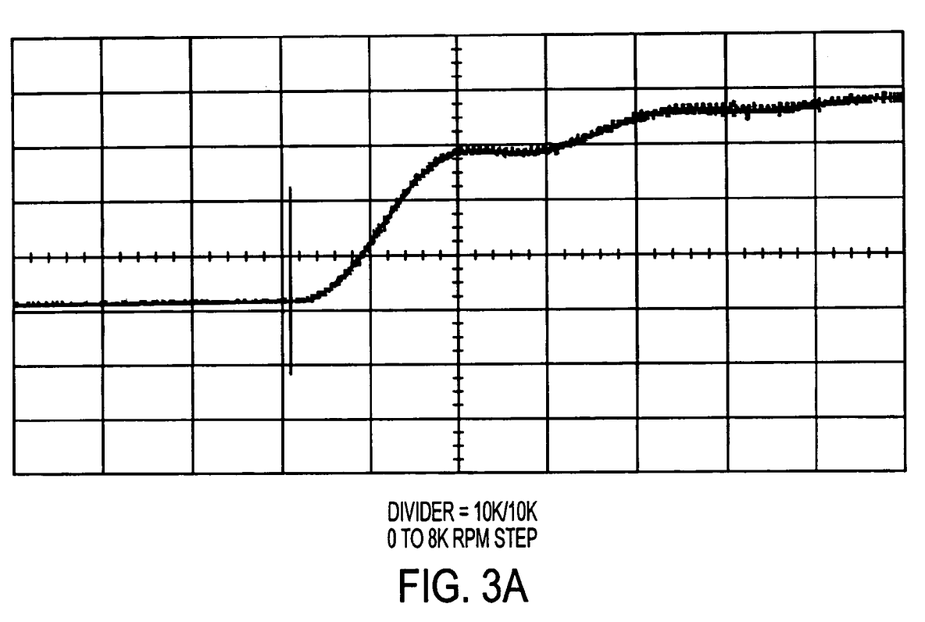
FIG. 3A is a scope printout depicting pointer flutter for a divider ratio of 10K/10K from 0 RPM to 8K RPM.
Figure 3B:
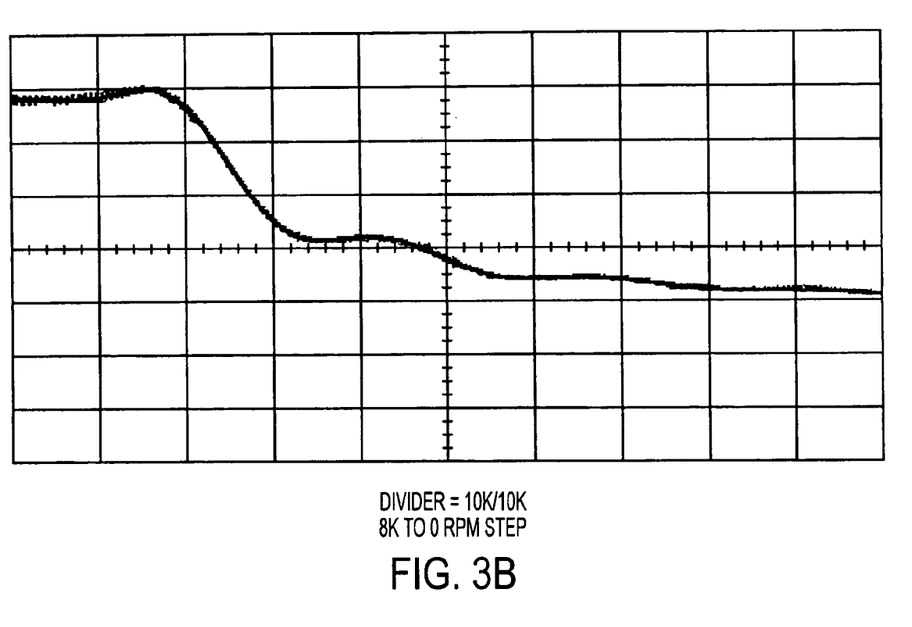
FIG. 3B is a scope printout depicting pointer flutter for a divider ratio of 10K/10K from 8K RPM to 0 RPM.
Figure 3C:
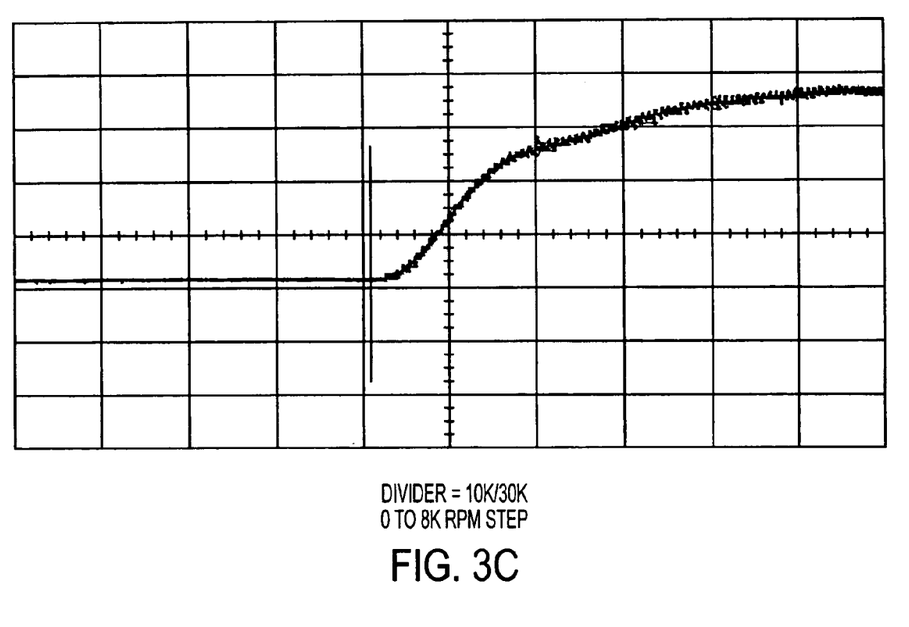
FIG. 3C is a scope printout depicting pointer flutter for a divider ratio of 10K/30K from 0 RPM to 8K RPM.
Figure 3D:
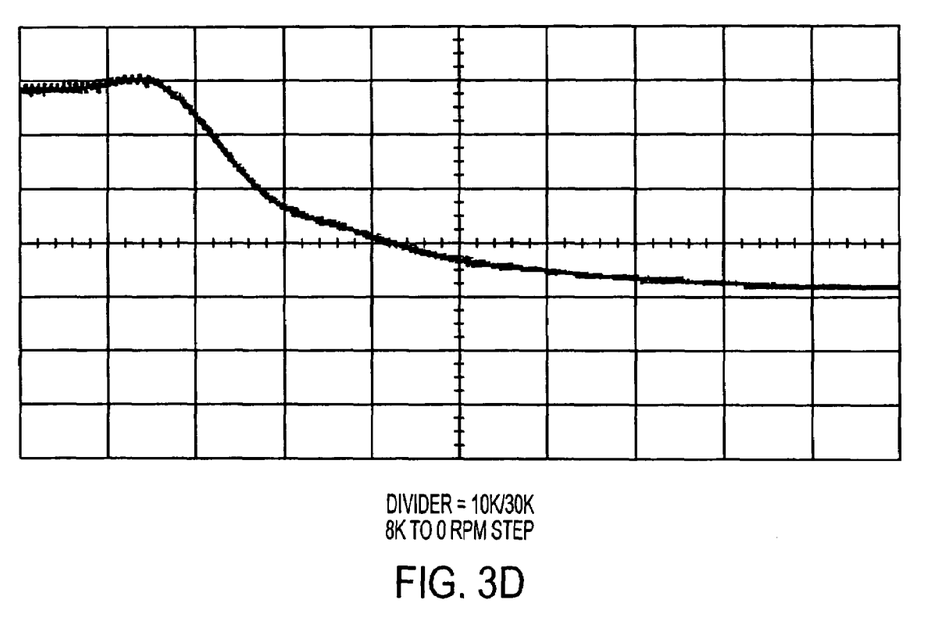
FIG. 3D is a scope printout depicting pointer flutter for a divider ratio of 10K/30K from 8K RPM to 0 RPM.
Figure 3E:
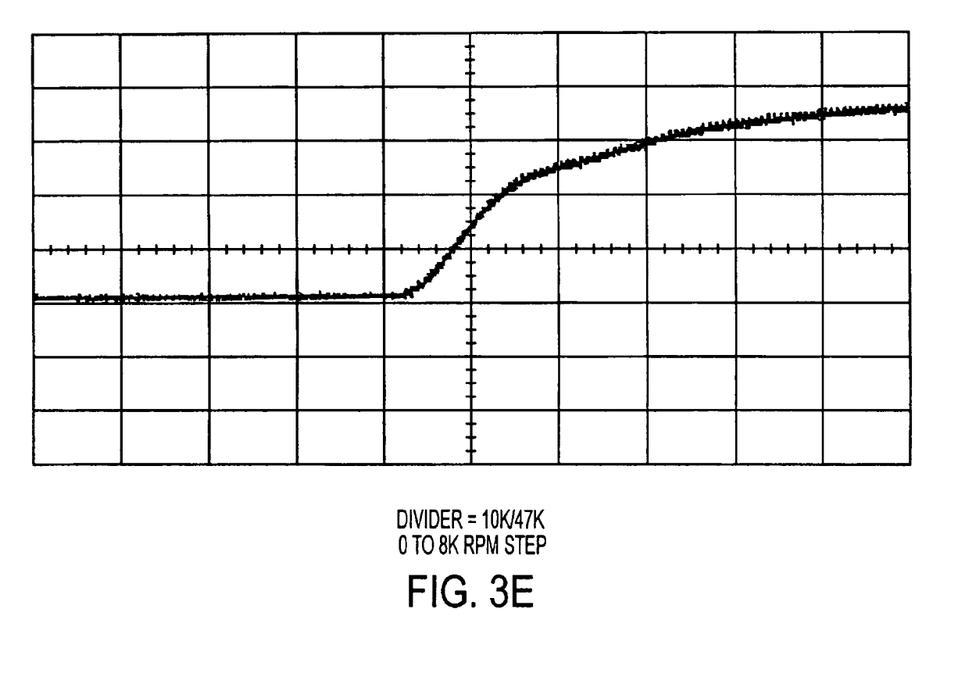
FIG. 3E is a scope printout depicting pointer flutter for a divider ratio of 10K/47K from 0 RPM to 8K RPM.
Figure 3F:
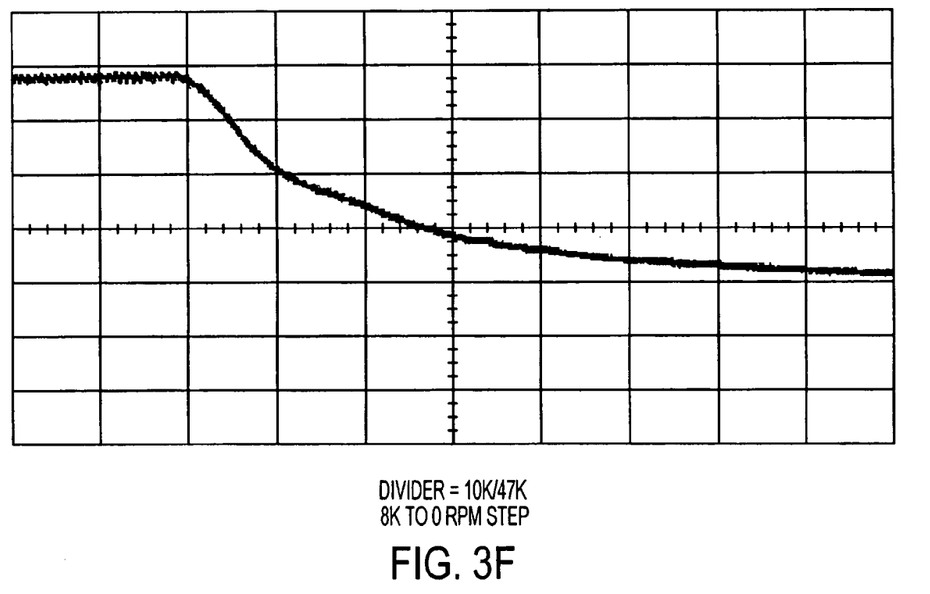
FIG. 3F is a scope printout depicting pointer flutter for a divider ratio of 10K/47K from 8K RPM to 0 RPM.

Experimentation with various divider 22 ratios was undertaken to determine the best ratio to obtain pointer movement that was smooth with minimal flutter and having good response time. Ratio refers the ratio of divider resistors R18/R19. FIG. 3A is a scope printout depicting pointer flutter for a divider ratio of 10K/10K from 0 RPM to 8K RPM. FIG. 3B is a scope printout depicting pointer flutter for a divider ratio of 10K/10K from 8K RPM to 0 RPM. As can be seen from the scope printouts, the pointer is not smooth when the engine RPM increases or as it decreases with a divider ratio of 10K/10K. FIG. 3C is a scope printout depicting pointer flutter for a divider ratio of 10K/30K from 0 RPM to 8K RPM. FIG. 3D is a scope printout depicting pointer flutter for a divider ratio of 10K/30K from 8K RPM to 0 RPM. As can be seen from the scope printouts of FIGS. 3C and 3D, there is substantial improvement in pointer movement when using a divider ratio of 10K/30K. FIG. 3E is a scope printout depicting pointer flutter for a divider ratio of 10K/47K from 0 RPM to 8K RPM. FIG. 3F is a scope printout depicting pointer flutter for a divider ratio of 10K/47K from 8K RPM to 0 RPM. Using a divider ratio of 10K/47K, the pointer movement is very smooth and desirable.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of the United States is:

1. A tachometer circuit comprising:
   a tachometer; and
   a flutter reduction circuit electrically coupled to and driving said tachometer, said flutter reduction circuit generating a voltage to cancel ripple voltages;
   wherein said flutter reduction circuit including a high pass filter circuit; and a tachometer driver circuit electrically coupled to said high pass filter circuit, said high pass filter circuit filtering the unwanted input voltages and generating the voltage to cancel ripple voltages; and
   said high pass filter circuit further includes an operational amplifier, said operational amplifier is biased by a bias signal from said driver circuit; and a voltage divider electrically coupled to said operational amplifier.

2. The tachometer circuit of claim 1, wherein said voltage divider further comprises two resistors in connected series.

3. The tachometer circuit of claim 1, wherein said operational amplifier outputs the voltage that is used to cancel rippled voltages.

4. The tachometer circuit of claim 1, wherein the tachometer is an aircore tachometer.

5. The tachometer circuit of claim 1, wherein said tachometer is an aircore mini-meter.

6. The tachometer circuit of claim 1, wherein the tachometer is a motorcycle tachometer.

7. The tachometer circuit of claim 1, wherein said high pass filter is connected to a charge pump filter capacitor.

8. The tachometer circuit of claim 1, wherein a divider ratio for the voltage divider is approximately 10/47.

9. The tachometer circuit of claim 1, further including input circuitry connected to said tachometer driver circuit.

10. The tachometer circuit of claim 1, further including a one shot circuit connected to said tachometer driver circuit.

11. A flutter reduction circuit for use with a tachometer, said flutter reduction circuit comprising:
    a high pass filter circuit; and
    a driver circuit electrically coupled to said high pass filter circuit, said high pass filter circuit passing unwanted input signals to a first circuit within the driver adapted to cancel out the signals and said high pass filter circuit generating a voltage to cancel ripple voltages; and
    wherein said high pass filter circuit further comprises:
    an operational amplifier; and
    a voltage divider electrically coupled to said operational amplifier.

12. The tachometer circuit of claim 11, further including a one shot circuit connected to said driver circuit.

13. The flutter reduction circuit of claim 11, wherein said voltage divider further comprises two resistors in connected series.

14. The flutter reduction circuit of claim 11, wherein said operational amplifier outputs the voltage that is used to cancel rippled voltages.

15. The flutter reduction circuit of claim 11, wherein said operational amplifier is biased by a bias signal from said driver integrated circuit.

16. The flutter reduction circuit of claim 11, wherein the flutter reduction circuit connects to an aircore tachometer.

17. The flutter reduction circuit of claim 11, wherein the flutter reduction circuit connects to an aircore mini-meter.

18. The flutter reduction circuit of claim 11, wherein the flutter reduction circuit connects to a motorcycle tachometer.

19. The tachometer circuit of claim 11, wherein said high pass filter is connected to a charge pump filter capacitor.

20. The flutter reduction circuit of claim 11, further including input circuitry connected to said driver circuit.

* * * * *